United States Patent [19]

Hadi et al.

[11] 4,094,953

[45] June 13, 1978

[54] PROCESS FOR RECOVERING MOLYBDENUM-99 FROM A MATRIX CONTAINING NEUTRON IRRADIATED FISSIONABLE MATERIALS AND FISSION PRODUCTS

[75] Inventors: Ali Sameh Abdel Hadi, Ettlinger-Schluttenbach; Johann Reinhardt, Eggenstein-Leopoldshafen; Jutta Knapp, Karlsruhe, all of Germany

[73] Assignee: Gesellschaft fur Kernforschung m.b.H., Karlsruhe, Germany

[21] Appl. No.: 777,627

[22] Filed: Mar. 14, 1977

[30] Foreign Application Priority Data

Mar. 16, 1976 Germany ............................ 2610948

[51] Int. Cl.[2] ........................ C01G 32/00; B01J 1/08

[52] U.S. Cl. .......................................... 423/2; 423/54

[58] Field of Search ...................................... 423/2, 54

[56] References Cited

U.S. PATENT DOCUMENTS

| | | | |
|---|---|---|---|
| 3,320,033 | 5/1967 | Goren | 423/54 |
| 3,450,639 | 6/1969 | Maria et al. | 423/54 X |
| 3,576,595 | 4/1971 | Chiola et al. | 423/54 |
| 3,940,318 | 2/1976 | Arino et al. | 423/2 X |
| 4,017,583 | 4/1977 | Motojima et al. | 423/2 |

FOREIGN PATENT DOCUMENTS

| | | | |
|---|---|---|---|
| 73,321 | 5/1970 | Germany | 423/54 |
| 2,349,804 | 4/1975 | Germany. | |
| 6,618,318 | 7/1967 | Netherlands | 423/54 |
| 967,823 | 8/1964 | United Kingdom | 423/54 |

OTHER PUBLICATIONS

Jenkins, I. L. "Extraction of Molybdenum from Radioactive Wastes" J. App. Chem. Oct. 14, 1964, pp. 449–454.

Green, H. "Separations Using Solvent Extraction" Metallurgia, Dec., 1964, pp. 297–302.

Gorlach, V. F. et al., *Ukr. Khim, Zh* 40(9): 983–985, 1974.

Yatirajam, V. et al., Anal. Chim. Acta, 59(3): 381–387, 1972.

Marchetti, E. S. et al. Ann. Chim., 59:902–911, 1969.

*Primary Examiner*—Richard E. Schafer
*Attorney, Agent, or Firm*—Spencer & Kaye

[57] ABSTRACT

Process for recovering molybdenum-99 from a matrix which has been irradiated with neutrons and contains fissionable materials and fission products, wherein the matrix is decomposed in an aqueous alkali hydroxide solution and the molybdenum-99 and part of the fission products are dissolved, the solution containing the molybdenum-99 is separated from a residue of particles containing at least actinides and lanthanides and is treated with thiocyanate ions to form a molybdenum complex. In the process, the alkali solution containing molybdenum in the form of molybdenum ($MoO_4^{--}$) is conditioned with an iodine reduction agent. Mineral acid is added to the alkali solution. The molybdenum contained in the acidfied solution is reduced to form three-valent molybdenum Mo(III) and the Mo(III) is complexed with $SCN^-$ ions to form $[Mo(SCN)_6]^{3-}$ ions. The $[Mo(SCN)_6]^{3-}$ ion containing solution is treated with a previously-conditioned, organic ion exchanger to selectively sorp the molybdenum. The ion exchanger, which is now charged with molybdenum, is separated from the solution which is now free of molybdenum. The separated molybdenum charged ion exchanger is washed with a wash solution in order to remove residual quantities of the molybdenum free solution. The molybdenum from the washed ion exchanger is eluted with a liquor at an elution temperature in the range from about 20° C to about 70° C.

18 Claims, No Drawings

PROCESS FOR RECOVERING MOLYBDENUM-99 FROM A MATRIX CONTAINING NEUTRON IRRADIATED FISSIONABLE MATERIALS AND FISSION PRODUCTS

BACKGROUND OF THE INVENTION

The present invention relates to a process for the recovery of molybdenum-99 from a matrix containing neutron irradiated, fissionable materials and fission products, in which the matrix is decomposed in an aqueous alkali hydroxide solution and the molybdenum-99 and part of the fission products are dissolved, the solution containing the molybdenum-99 is separated from a residue of solid particles containing at least actinides and lanthanides and is treated with thiocyanate ions in order to form a molybdenum-99 complex.

In nuclear medicine, the significance of Tc-99 is continuously at an increase as an indicator in the diagnosis of tumors. Since, however, technitium has a relatively short halflife ($T_{\frac{1}{2}}$ = 6.0 h), the mother nuclide Mo-99 is eluted when required. Thus, a technitium generator is used to provide the technitium. The technitium generators generally comprise a chromatographic column having Mo-99 bearing molybdate ion absorbed thereon. Radioactive decay of the relatively, long-lived Mo-99 produces Tc-99. Elution of the chromatographic column provides an on-the-spot source of the technitium.

Previously, natural molybdenum which had been activated in reactors was used in the generators to produce the technitium. The drawbacks of this natural molybdenum material are that large columns are required for small specific activities, large injection volumes are required in order to retain the required activity, and there is a very limited availability of the generator due to the low activity.

Fission molybdenum has been found to be useful in technitium generators to produce the technitium and has been used to a greater degree in recent times. This, however, requires much refined processing technology in order to obtain the required degree of molybdenum purity. The required radionuclide purity of the fission molybdenum for use in a technitium generator is:

$\gamma$:
I-131 <0.05 μC/mC Mo-99
Ru-103 <0.05 μC/mC Mo-99
Total $\gamma$ contamination <0.1 μC/mC Mo-99
$\alpha$:
no more than 1 nanocurie total $\alpha$ activity per curie Mo-99
$\beta$:
Sr-89 <6 × $10^{-4}$ μC/mC Mo-99
Sr-90 <6 × $10^{-5}$ μC/mC Mo-99

A long known method for proving the presence of molybdenum where the molybdenum is present in solution as molybdate comprises reducing the molybdate with $SnCl_2$ to Mo(III), then binding the Mo(III) to $SCN^-$ ions to form a thiocyanate complex, and thereafter extracting the thiocyanate complex with the aid of diethyl ether. This method is completely useless in the recovery of Mo-99 because of the great volatility and combustibility of the diethyl ether inasmuch as the risk of a fire or explosion must be completely eliminated when working with radioactive substances.

A number of publications discuss methods which use thiocyanate ions, but these methods operate principally with the use of additional extracting agents in the organic phase, such as, for example, with tributyl phosphate (TBP) (Gorlach, V. F., Marchenko, L. M. (Kiev State University), *Ukr. Khim. Zh.;* 40: No. 9, 983–985, September, 1974 (in Russian)); or with tribenzylamine (Yatirajam, V., Ram, Jaswant (University of Kurukshetra, India), *Anal. Chim. Acta;* 59; No. 3, 381–387, May 1972); or with 2-furaldehyde (Spaccamela Marchetti, Elena, Cereti Mazza, Maria Teresa (Politecnico, Turin) *Ann. Chim.*, Rome, 59: 902–911, 1969 (in Italian)). These methods have the drawback that the additional organic extraction agents may lead to contamination of the final product which could result in behavioral malfunctions of the molybdenum on the generators. Furthermore, these contaminants may have a pyrogenic effect.

German Offenlegungsschrift No. 23 49 804 (laid-open on Apr. 17th, 1975) discloses a process for the recovery of molybdenum-99 from fission products in which the matrix containing irradiated uranium, in the case of the use of uranyl nitrate as target, is dissolved in water and treated, before the separation of Mo, with 5 N $HNO_3$, or, in the case of the use of an uranium aluminum matrix, the matrix is dissolved within 30 minutes in a 5 M sodium solution which is 2 molar nitrite. In both cases, the solution is then filtered from the residue. The molybdenum is then separated out of the respective solutions from the other fission products by two dividing operations which can be combined and repeated in a certain sequence. When an alkali solution is used as the starting solution, it is necessary to pretreat the solution before the first dividing operation. This pretreatment includes an addition of potassium iodide solution (as carrier for iodine), neutralization and acidification of the alkali solution with silver nitrate containing 5 molar $HNO_3$, a standing for 20 minutes to precipitate AgI, and a separation of the precipitation deposit from the solution.

Then the solution is treated according to the first dividing operation. In the first dividing operation, the solution containing the molybdenum as molybdate, which solution is about 2 molar $HNO_3$, is fed to a column charged with aluminum oxide. This causes practically all fissionable substances and fission products to be sorbed onto the column. The aluminum oxide column is then subjected to a number of elution steps. Firstly, the column is eluted with 1 N $HNO_3$. The time required for this first elution, for a column having a diameter of 2 cm and a 8 cm fill level, is about 100 minutes. (The time periods disclosed hereafter for the further steps of the first dividing operation are with respect to a column having a diameter of 2 cm and a 8 cm fill level.) Thereafter, the aluminum oxide column is treated with water. The time required for the water treatment is about 60 minutes. The aluminum oxide column is then eluted with a 0.1 N $NH_4OH$ solution for a required time of about 30 minutes and subsequently with a 25 ml, 1 N $NH_4OH$ solution for a required time of about 8 minutes. The elution with nitric acid and diluted ammonium hydroxide solution separates the uranium and all fission products, except for tellurium, from the molybdenum. The molybdenum is then supposed to be elutable with a further 1 N $NH_4OH$ solution to provide an 80% yield. The time required for the molybdenum elution is about 40 minutes.

In the second dividing operation, the eluate containing Mo-99 and contaminants, such as, for example, iodine, is acidified with $HNO_3$ to a pH of 1 to 2. Potassium iodate and sulfurous acid are added, and thereafter potassium iodate and potassium iodide are again added, as carriers for iodine. The additions of carrier in this sequence are to assure complete conversion of the fission product iodine to iodide. Then the solution is sucked slowly through a layer of fine particles of freshly-made silver chloride. The time required for this treatment with silver chloride is about 15 minutes. The molybdate yield in this operation is supposed to be about 95%.

The drawbacks of this process can easily be discerned and include time consuming and complicated mode of operation, sorption of all actinides and almost all fission products together with molybdenum on the aluminum oxide, carrying along of contaminants with the molybdenum during the elution and low total yield of approximately 76%. In addition, elemental iodine is carried along throughout the entire process due to the use of $HNO_3$.

SUMMARY OF THE INVENTION

It is an object of the present invention to overcome the drawbacks of the known processes and provide a simple, easily-practiced and safe process which assures a very high yield of an extremely pure Mo-99 product.

A further object of the present invention is to provide such a process which has a minimum of process stages, such as, for example, sorption stages and elution stages, and results in a reduction of the quantity of contaminated, organic waste.

Another object of the present invention is to provide such a process which is easily handled as a matter of routine and with remote control.

Additional objects and advantages of the present invention will be set forth in part in the description which follows and in part will be obvious from the description or can be learned by practice of the invention. The objects and advantages are achieved by means of the processes, instrumentalities and combinations particularly pointed out in the appended claims.

To achieve the foregoing objects and in accordance with its purpose, the present invention, as embodied and broadly described, provides a process for recovering molybdenum-99 from a matrix which has been irradiated with neutrons and contains fissionable materials and fission products, wherein the matrix is decomposed in an aqueous alkali hydroxide solution and the molybdenum-99 and part of the fission products are dissolved, the solution containing the molybdenum-99 is separated from a residue of particles containing at least actinides and lanthanides and is treated with thiocyanate ions to form a molybdenum complex, comprising: (a) conditioning the alkali solution containing molybdenum in the form of molybdate ($MoO_4^{--}$) with an iodine reduction agent in a quantity corresponding to a concentration range between $10^{-4}$ Mol and 0.2 Mol per liter alkali solution; (b) adding mineral acid to the alkali solution until a hydronium ion concentration in the range from 0.1 to 6 Mol/l has been reached; (c) reducing the molybdenum contained in the acidified solutions of step (b) to form a three-valent molybdenum Mo(III) and complexing the Mo(III) with $SCN^-$ ions to form $[Mo(SCN)_6]^{-3}$ ions, the $SCN^-$ ions being present in an ion concentration in the range between 0.1 Mol/l and 3 Mol/l of the solution being subjected to reduction; (d) treating the acid solution containing the $[Mo(SCN)_6]^{3-}$ ions from step (c) with a previously-conditioned, organic ion exchanger of the type of a chelate-forming synthetic resin on the basis of a styrene-divinyl benzene copolymer containing methylene nitrilo diacetate groups as functional groups and having a particle size in the range between 35μ and 840μ for selectively sorbing the molybdenum; (e) separating the ion exchanger of step (d) which is charged with molybdenum from the solution now free of molybdenum; (f) washing the separated molybdenum-charged ion exchanger in a wash solution of diluted mineral acid containing a low concentration of an iodine reduction agent, the quantity of wash solution corresponding to 5 to 10 times the volume of the ion exchanger quantity employed, so as to remove residual quantities of the molybdenum-free solution; and (g) eluting the molybdenum from the washed ion exchanger with a liquor at an elution temperature in the range from about 20° C to about 70° C.

In one embodiment of the present invention, the reduction to form the Mo(III) ions and the complexing of the Mo(III) ions is effected by mixing the acidified solution from step (b) with an aqueous thiocyanate ion solution containing metallic zinc or metallic aluminum to form a solution which contains the metallic zinc or aluminum in a concentration range between 10 mg/l and 2000 mg/l and a concentration of thiocyanate ions in the range between 0.1 Mol/l and 3 Mol/l of solution; and reducing the molybdenum contained in the acidified solution of step (b) with the aid of the hydrogen produced from a reaction between the hydronium ions and the metallic zinc or the metallic aluminum to form the three-valent molybdenum Mo(III) which then complexes with the $SCN^-$ ions to form $[Mo(SCN)_6]^{3-}$ ions.

In another embodiment of the present invention, the reduction to form the Mo(III) ions and the subsequent complexing is effected by initially subjecting the acidified solution from step (b) to a cathodic reduction whereby the molybdenum is reduced to molybdenum (III), and bringing the resulting Mo(III) into contact with thiocyanate ions to form complexes, the concentration of the thiocyanate ions in the solution being subjected to the cathode reduction being in the range between 0.1 Mol/l and 3 Mol/l.

It is to be understood that both the foregoing general description and the following detailed description are exemplary, but are not restrictive of the invention.

DETAILED DESCRIPTION OF THE INVENTION

In the process of the present invention, an alkali solution which contains molybdenum as molybdate ($MoO_4^{--}$) is treated. This alkali solution generally is one which is formed during the recovery of Mo-99 from targets which have been subjected to an enrichment process. Customarily, Mo-99 is recovered and isolated from plates or cylinders in the form of uranium-aluminum targets which have been enriched with uranium-235. In order to realize a high Mo-99 yield or fission rate with the same quantity of uranium, the target material contains about 93% of enriched uranium-235.

In view of the short cooling periods for the target to be processed, iodine isotopes, such as I-131, I-132 and I-133, are very much involved in the iodine emission rate. In order to assure that this emission rate is reduced to values below those set by safety councils, agencies and laws of various countries, the uranium-aluminum targets are decomposed in an alkali solution and iodine reduction agents are added so that elemental iodine is converted to iodide ions. Thus, and due to the avoidance of the presence of $NO_3^-$ or $NO_2^-$ ions in the process according to the present invention, the possible danger of fire in the activated carbon filter beds being used to retard the fission gases Xenon -133 and 135 is prevented.

If a U/Al alloy containing uranium which has been enriched to 93% is selected to produce Mo-99, the yield from a U/Al sample, for example, containing 1 g U-235 without consideration of the flux depression of the sample, and with a neutron flux of $5 \cdot 10^{13}\ cm^{-2}sec^{-1}$, after a period of irradiation and a period of cooling and a period of processing of three days each, is 30 C Mo-99.

It is also possible, however, to subject other matrices containing uranium as the fissionable material or other fissionable materials, respectively, to neutron irradiation in order to produce Mo-99.

For an alkali decomposition, the matrix is treated with sodium liquor at about 120° C. Thus, the aluminum and the fission products molybdenum, tellurium and iodine, as well as the alkali and earth alkali metals are quantitatively dissolved. Part of the resulting fission products zirconium and ruthenium are also dissolved, while the lanthanides and actinides as well as the major portion of Ru and Zr remain undissolved in the form of mud.

After filtering the mud, the alkali solution is used as the starting solution to obtain a highly pure molybdenum-99 according to the process of the invention.

In the practice of the present invention, the starting alkali solution is conditioned with an iodine reduction agent. Exemplary of suitable iodine reduction agents are sulfite ions in aqueous solution, such as, for example, sodium sulfite or potassium sulfite. In addition, hydroxyl ammonium sulfate or hydrazine sulfate can be used as iodine reduction agents. The iodine reduction agent generally is used in a quantity corresponding to a concentration range between $10^{-4}$ Mol and 0.2 Mol per liter of alkali solution. In order to condition the alkali starting solution with $Na_2SO_3$ as the iodine reduction agent, it is sufficient, for example, to have a sulfite concentration in the alkali solution of 0.1 Mol to 0.05 Mol per liter.

In the practice of the present invention, a mineral acid is added to the alkali solution until a hydronium ion concentration ($H_3O^+$ ion concentration) in the range between 0.1 and 6 Mol/l has been reached. The mineral acid which is added to the alkali solution advantageously can be hydrochloric acid or sulfuric acid. The acid concentration after addition of the acid preferably can be, for example, in the range from 0.5 to 3 Mol/l.

In the practice of the present invention, the molybdenum contained in the alkali solution is reduced to form a three-valent molybdenum Mo(III) and the Mo(III) is complexed with $SCN^-$ ions to form $[Mo(SCN)_6]^{-3}$ ions. The valency of the $Mo^{+++}$ formed by the reduction is thus stabilized by the creation of the stable thiocyanate complex $[Mo(SCN)_6]^{-3}$. This reduction and complexing can be performed in either of two techniques.

In the first reduction and complexing technique, an aqueous thiocyanate-containing solution is added to the alkali solution to form a conditioned alkali solution which contains mineral acid and thiocyanate ions. The thiocyanate ion containing solution which is added to the alkali solution can be a solution based on $NH_4SCN$, NaSCN or KSCN or mixtures of these thiocyanate ion forming compounds. In addition to containing these thiocyanate ion forming compounds, the thiocyanate solution which is added to the alkali solution contains metallic zinc or metallic aluminum. The solution which is formed upon addition of the thiocyanate containing solution to the alkali solution contains the metallic zinc or aluminum in a concentration range between 10 mg/l and 2000 mg/l and a concentration of thiocyanate ions in the range between 0.1 Mol/l and 3 Mol/l. The thiocyanate concentration sufficient for complex formation generally is about 1 to 2 Mol/l of solution. In the presence of larger quantities of aluminum or foreign cations, respectively, the thiocyanate concentration may possibly have to be increased to 3 Mol/l.

The molybdenum in this conditioned acidified, and thiocyanate-containing solution is reduced with the aid of the hydrogen produced from a reaction between the hydronium ions and the metallic zinc or the metallic aluminum to form a three-valent molybdenum Mo(III). The Mo(III) is then complexed with the $SCN^-$ ions in the solution to form $[Mo(SCN)_6]^{-3}$ ions.

The conditioning and acidification of the alkali solution and addition of the thiocyanate solution to the alkali solution can take place in the sequence of firstly conditioning, secondly acidifying, and thirdly adding the thiocyanate solution. The conditioning, acidification and addition of the thiocyanate solution, however, need not necessarily take place in the above sequence, and can be effected in a different sequence such as adding $SCN^-$ in the alkali solution and subsequent acidifying.

In the second technique for reducing and complexing the molybdenum in the alkali solution, the molybdenum is reduced by a cathode reduction. In this technique, a conditioned and acidified alkali solution is initially subjected to a cathodic reduction to reduce the molybdenum to Mo(III). The resulting Mo(III) is brought into contact with thiocyanate ions to form the $[Mo(SCN)_6]^{-3}$ complexes. The concentration of the thiocyanate ions in the acidified alkali solution to effect this complexing is in the range between 0.1 Mol/l and 3 Mol/l. To achieve the desired thiocyanate ion concentration in the alkali solution, a thiocyanate containing solution based on $NH_4SCN$, NaSCN, or KSCN or mixtures thereof can be added to the alkali solution. As in the first technique, the various additions to the alkali solution can be in the sequence of conditioning, acidification and addition of thiocyanate containing solution, but other sequences can be employed.

The cathiodic reduction of the molybdate to Mo(III) results in the great advantage that no further quantities of ions which would increase the proportion of solids in the solution and thus the waste volume are introduced into the solution and that a lower concentration of thiocyanate ions is required.

In the practice of the present invention, the acid solution containing the $[Mo(SCN)_6]^{3-}$ ions is treated with a previously-conditioned, organic ion exchanger. The organic ion exchanger is of the type of a chelate-forming, synthetic resin on the basis of a styrene divinyl benzene copolymer containing methylene nitrilo diacetate groups as functional groups and have a particle size in the range between 35μ and 840μ for the selective sorption of the molybdenum. The organic ion exchanger could consist of e.g.

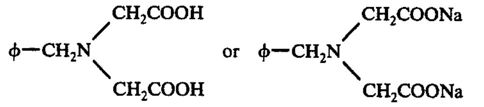

The $[Mo(SCN)_6]^{3-}$ complex is selectively and quantitatively retained by the pretreated or conditioned organic ion exchanger which may be contained, for example, in a short, thick-walled glass column. All fission products considered to be contaminants in the production of Mo-99 and other constitutents of the treated solution flow through this glass column.

Conditioning of the organic ion exchanger can be effected with a mineral acid, such as hydrochloric acid or sulfuric acid, as a mobile phase which acts on the ion exchanger which serves as a stationary phase. Conditioning of the organic ion exchanger is best effected with a diluted thiocyanate ion containing mineral acid, such as diluted hydrochloric acid or diluted sulfuric acid both containing a small amount of about 0.01 percent by volume of $H_2SO_3$. The quantity of the mobile conditioning phase that is used is preferably from 5 to 20 ml per gram of ion exchanger. Suitable concentrations of the diluted hydrochloric and sulfuric acids are 2 to 4 N HCl or $H_2SO_4$ and the concentration of thiocyanate ions is 0.01 N sulfit and 0.1 N $SCN^-$.

The treatment of the acid solution containing the $[Mo(SCN)_6]^{-3}$ ions with the ion exchanger charges the ion exchanger with the molybdenum complex and the charged exchanger is then separated from the remaining solution which is now free of molybdenum.

The separated molybdenum-charged ion exchanger is then washed with a wash solution of diluted mineral acid which contains a low concentration of an iodine reduction agent in order to remove residual quantities of the molybdenum free solution. The quantity of wash solution corresponds to 5 to 10 times the volume of the quantity of ion exchanger employed. The wash solution can be, for example, diluted hydrochloric or sulfuric acid. Thus, the wash solution for the ion exchanger charged with $[Mo(SCN)_6]^{3-}$ can be, for example, 0.1–0.001 M hydrochloric acid or 0.1–0.001 M sulfuric acid which is 0.01–0.0001 molar in $H_2SO_3$.

After washing, the molybdenum from the washed ion exchanger is then eluted with a liquor at an elution temperature in the range from about 20° C to about 70° C.

The elution of Mo-99 from the charged and washed ion exchanger can be effected, for example, with a sodium liquor or a potassium liquor of a concentration in the range from 0.1 Mol/l to 10 Mol/l under normal (atmospheric) pressure or with aqueous ammonium hydroxide solution of a concentration in the range from 1 Mol/l to 10 Mol/l at increased (above atmospheric) pressure up to 10 atmospheres. The elution can also be effected with a liquor or a higher concentration, but higher concentrations generally are not necessary and are not appropriate.

The elution of Mo-99 is preferably effected with a 0.5 molar to 6 molar sodium liquor in a quantity of about 50 ml per mg Mo-99 at 60° C or with 2 molar to 6 molar $NH_4OH$ solution in a quantity of about 50 ml per mg Mo-99 at 60° C and a pressure of about 3 atmospheres.

For an ion exchanger particle size between 75μ and 150μ, the most favorable elution temperature lies in a range from 50° to 60° C, and, for a particle size between 150μ and 300μ, the most favorable elution temperature lies at about 20° C.

No contaminants can be found in the eluted molybdenum. The decontamination factor of the process lies above $10^6$. The resulting degree of purity for the Mo-99 produced according to the process of the invention is greater than that set for use in medicine. As shown by experiments, the yield of Mo-99 is more than 90% and, under optimum process conditions, even more than 99.5% of the Mo-99 originally present in the alkali starting solution.

The process according to the present invention has a number of further advantages. For example, volatile, easily-combustible, organic substances, such as, for example, organic solvents, are not present in this process. Thus, a danger of fire is eliminated. This is of particular significance for the handling of freshly-irradiated nuclear fuels, in view of the still present particularly dangerous volatile nuclides, such as, for example, I-131, I-132 and I-133. Additionally, the danger of formation of volatile, difficultly-adsorbable organic iodine compounds, such as, for example, $CH_3I$, is minimized. Moreover, the retention capability of the column referring to the ion exchange resin, is independent of the aluminum concentration.

The present invention will be explained below with the aid of a few examples which, however, in no way limit the invention.

EXAMPLE 1

To determine the decontamination factor, an alkali solution containing, in addition to Mo-99, the radioactive fission products Cs-137, Ba-140, Ce-143, La-140, Nd-147, Ru-106, Te-132, I-131, I-132 and I-133, was conditioned with $Na_2SO_3$ and acidified with sulfuric acid. Thiocyanate ions and zinc granules were added to the solution. The decontamination factors were more than $10^6$ for Cs, Ba, Ce. La, Nd and more than $10^5$ for I-131, Te, and Ru.

EXAMPLE 2

To determine the yield of Mo-99 after treatment with the ion exchange resin in relation to the quantity of Mo-99 present in the acidified solution in the form of the $[Mo(SCN)_6]^{3-}$ complex before treatment with the ion exchange resin, 100 ml of a sulfuric acid solution containing approximately 3 Mol/l $H_3O^+$ ions and 4.3 mg Mo present as a thiocyanate complex were added during approximately 10 minutes to approximately 18 ml of a conditioned ion exchange resin of a grain size of 75μ to 150μ which was disposed in a column. The charged ion exchanger was then washed with approximately 100 ml of 0.01 molar sulfuric acid which was 0.01 molar in $H_2SO_3$. The time required for this washing was about 10 minutes. After washing, the washed ion exchanger resin was eluted at 60° C with 100 ml of 6.0 molar sodium liquor. The time required for this elution was approximately 1 to 2 ml/minute. The Mo-99 yield was measured in pulses per minute and the results were as follows:

| Mo-99 activity before sorption (pulses/min) | Mo-99 loss in the wash solution | Mo-99 activity in the eluate (pulses/min) | Yield (%) |
|---|---|---|---|
| 685,200 | <0.1% | 684,515 | 99.90 |

EXAMPLE 3

In this example, the procedure of Example 2 was repeated and the sorption of the Mo complex and the elution conditions were the same as in Example 2, with the exception that the elution was effected with 0.5 molar sodium liquor.

| Results: | | | |
|---|---|---|---|
| Mo-99 activity before sorption (pulses/min) | Mo-99 loss in the wash solution | Mo-99 activity in the eluate (pulses/min) | Yield (%) |
| 175,520 | <0.1% | 175,345 | 99.90 |

EXAMPLE 4

In this example, the procedure of Example 2 was repeated and the sorption of the Mo complex and the elution conditions were the same as in Example 2, but elution was effected with 150 ml 6 molar $NH_4OH$ solution at 23° C.

| Results: | | | |
|---|---|---|---|
| Mo-99 activity before sorption (pulses/min) | Mo-99 loss in the wash solution | Mo-99 activity in the eluate (pulses/min) | Yield (%) |
| 638,000 | <0.1% | 574,200 | 90.00 |

Even with the use of larger ion exhange sorption columns, such as those having a volume of greater than 20 $cm^3$, the flowthrough speed during addition of the acidified solution containing the $[Mo(SCN)_6]^{3-}$ ions and during addition of the wash solution can be one-half the ion exchange column volume per minute, and, during addition of the elution liquor (alkali elution solution) to elute the Mo-99, the flowthrough speed can be 1/10 of the column volume per minute. Fluctuation in the flowthrough speed by a factor in the range of ½ to 2 of the given values are possible, however, without adverse influence on the process.

It will be understood that the above description of the present invention is susceptible to various modifications, changes and adaptations, and the same are intended to be comprehended within the meaning and range of equivalents of the appended claims.

What is claimed is:

1. Process for recovering molybdenum-99 from a matrix which has been irradiated with neutrons and contains fissionable materials and fission products, wherein the matrix is decomposed in an aqueous alkali hydroxide solution and the molybdenum-99 and part of the fission products are dissolved, the solution containing the molybdenum-99 is separated from a residue of particles containing at least actinides and lanthanides and is treated with thiocyanate ions to form a molybdenum complex comprising the steps of:
   (a) conditioning the alkali solution containing molybdenum in the form of molybdate ($MoO_4^{--}$) with an iodine reduction agent in a quantity corresponding to a concentration range between $10^{-4}$ Mol and 0.2 Mol per liter alkali solution;
   (b) adding mineral acid to the alkali solution until a hydronium ion concentration in the range from 0.1 to 6 Mol/l has been reached;
   (c) reducing the molybdenum contained in the acidified solution of step b) to form a three-valent molybdenum Mo(III) and complexing the Mo(III) with $SCN^-$ ions to form $[Mo(SCN)_6]^{3-}$ ions, said $SCN^-$ ions being present in an ion concentration in the range between 0.1 Mol/l and 3 Mol/l of the solution being subjected to the reduction;
   (d) treating the $[Mo(SCN)_6]^{3-}$ ion containing acid solution from step (c) with a previously conditioned, organic ion exchanger of the type of a chelate forming synthetic resin on the basis of a styrene divinyl benzene copolymer containing methylene nitrilo diacetate groups as functional groups and having a particle size in the range between 35μ and 840μ for selectively sorping the molybdenum;
   (e) separating the ion exchanger from step (d), which is charged with molybdenum, from the solution now free of molybdenum;
   (f) washing the separated molybdenum charged ion exchanger with a wash solution of diluted mineral acid containing a weak concentration of an iodine reduction agent, the quantity of the wash solution corresponding to 5 to 10 times the volume of the quantity of ion exchanger employed, in order to remove residual quantities of the molybdenum free solution;
   (g) eluting the molybdenum from the washed ion exchanger with a liquor at an elution temperature in the range from about 20° C to about 70° C.

2. Process as defined in claim 1 wherein the reduction to form the Mo(III) ions and the complexing of the Mo(III) ions is effected by mixing the acidified solution from step (b) with an aqueous thiocyanate ion solution containing metallic zinc or metallic aluminum, to form a solution which contains the metallic zinc or aluminum in a concentration range between 10 mg/l and 2000 mg/l and a concentration of thiocyanate ions in the range between 0.1 Mol/l and 3 Mol/l, and reducing the molybdenum contained in the acidified solution of step (b) with the aid of the hydrogen produced from a reaction between the hydronium ions and the metallic zinc or the metallic aluminum to form the three-valent molybdenum Mo(III) which then complexes with the $SCN^-$ ions to form $[Mo(SCN)_6]^{3-}$ ions.

3. Process as defined in claim 1 wherein the reduction to form the Mo(III) ions and the subsequent complexing is effected by initially subjecting the acidified solution from step (b) to a cathodic reduction whereby the molybdenum is reduced to molybdenum (III), and bringing the resulting Mo(III) into contact with thiocyanate ions to form complexes, the concentration of the thiocyanate ions in the solution subjected to the cathode reduction being in the range between 0.1 Mol/l and 3 Mol/l.

4. Process as defined in claim 1 wherein sulfite ions in aqueous solution are used as the iodine reduction agent.

5. Process as defined in claim 4 wherein the sulfite ions are supplied by sodium sulfite, potassium sulfite or a mixture thereof.

6. Process as defined in claim 1 wherein hydroxyl ammonium sulfate is used as the iodine reduction agent.

7. Process as defined in claim 1 wherein hydrazine sulfate is used as the iodine reduction agent.

8. Process as defined in claim 1 wherein hydrochloric acid or sulfuric acid are employed for the addition of mineral acid in step (b) and for the wash solution in step (f).

9. Process as defined in claim 1 wherein a solution of $NH_4SCN$, NaSCN, KSCN or a mixture thereof is used to provide the thiocyanate ions for step (c).

10. Process as defined in claim 1 wherein the conditioning of the organic ion exchanger is effected with diluted hydrochloric acid or diluted sulfuric acid.

11. Process as defined in claim 10 wherein the conditioning of the organic ion exchanger is effected with diluted hydrochloric acid or diluted sulfuric acid in a quantity of 5 to 20 ml/g ion exchanger.

12. Process as defined in claim 11 wherein the conditioning of the organic ion exchanger is effected with a thiocyanate containing diluted hydrochloric acid or a thiocyanate containing diluted sulfuric acid, said diluted acid containing a small proportion of about 0.01 percent by volume of $H_2SO_3$.

13. Process as defined in claim 1 wherein the elution of the Mo-99 in step (g) is effected with sodium liquor or potassium liquor of a concentration in the range from 0.1 Mol/l to 10 Mol/l under normal pressure.

14. Process as defined in claim 13 wherein the elution of the Mo-99 is effected with 0.5 molar to 6 molar sodium liquor in a quantity of about 50 ml per mg Mo-99 at 60° C.

15. Process as defined in claim 1 wherein the elution of the Mo-99 in step (g) is effected with aqueous ammonium hydroxide solution of a concentration in the range from 1 Mol/l to 10 Mol/l at increased pressure up to 10 atmospheres.

16. Process as defined in claim 15 wherein the elution of the Mo-99 is effected with 2 molar to 6 molar $NH_4OH$ solution in a quantity of about 50 ml per mg Mo-99 at 60° C and under a pressure of about 3 atmospheres.

17. Process as defined in claim 1 wherein the elution temperature for an ion exchanger particle size between 75μ and 150μ lies in a range between 50° and 60° C.

18. Process as defined in claim 1 wherein the elution temperature for an ion exchanger particle size between 150μ and 300μ lies approximately at 20° C.

* * * * *